United States Patent
Ahuja et al.

(10) Patent No.: US 11,132,283 B2
(45) Date of Patent: Sep. 28, 2021

(54) DEVICE AND METHOD FOR EVALUATING INTERNAL AND EXTERNAL SYSTEM PROCESSORS BY INTERNAL AND EXTERNAL DEBUGGER DEVICES

(71) Applicant: RENESAS ELECTRONICS AMERICA INC., Milpitas, CA (US)

(72) Inventors: Ashish Ahuja, Santa Clara, CA (US); Michael R. Merrill, Tracy, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 17/003,727

(22) Filed: Aug. 26, 2020

(65) Prior Publication Data

US 2021/0103513 A1   Apr. 8, 2021

Related U.S. Application Data

(60) Provisional application No. 62/912,490, filed on Oct. 8, 2019.

(51) Int. Cl.
*G06F 11/36* (2006.01)
*G06F 11/30* (2006.01)
*G06F 11/32* (2006.01)

(52) U.S. Cl.
CPC ...... *G06F 11/3656* (2013.01); *G06F 11/3089* (2013.01); *G06F 11/321* (2013.01); *G06F 11/328* (2013.01)

(58) Field of Classification Search
None
See application file for complete search history.

(56) References Cited

U.S. PATENT DOCUMENTS

| | | | | |
|---|---|---|---|---|
| 5,943,498 A | * | 8/1999 | Yano | G06F 11/3656 717/128 |
| 6,058,393 A | * | 5/2000 | Meier | G06F 11/3664 707/999.01 |
| 7,627,784 B1 | * | 12/2009 | Allen | G06F 11/3636 714/30 |
| 8,769,495 B1 | * | 7/2014 | Gupta | G06F 11/3656 717/124 |

(Continued)

*Primary Examiner* — Qing Chen
(74) *Attorney, Agent, or Firm* — Foley & Lardner LLP

(57) ABSTRACT

Present implementations include an electronic device with a system processor (SP) region connectable to an SP, a primary device region connectable to a first electronic device, and a secondary device region disposed between the SP device region and the primary device region, and connectable to a second electronic device. Present implementations further include a debugger region including a debugger unit and disposed adjacent to the primary device region and the secondary device region. Present implementations also include obtaining a debug selection including a debugger selection and a system processor (SP) selection, entering a first debug mode in accordance with a determination that the debugger selection satisfies a debugger criterion and the SP selection satisfies an SP criterion, and entering a second debug mode in accordance with a determination that the debugger selection satisfies the debugger criterion and the SP selection does not satisfy the SP criterion, and entering a third debug mode in accordance with a determination that the debugger selection does not satisfy the debugger criterion.

20 Claims, 7 Drawing Sheets

(56) References Cited

U.S. PATENT DOCUMENTS

| | | | | |
|---|---|---|---|---|
| 9,946,631 | B1* | 4/2018 | Cook | G06F 16/24568 |
| 2004/0111707 | A1* | 6/2004 | Bliss | G06F 11/362 |
| | | | | 717/129 |
| 2006/0059286 | A1* | 3/2006 | Bertone | G06F 9/30014 |
| | | | | 710/260 |
| 2006/0069953 | A1* | 3/2006 | Lippett | G06F 11/3636 |
| | | | | 714/25 |
| 2008/0301417 | A1* | 12/2008 | Law | G06F 11/3644 |
| | | | | 712/227 |
| 2009/0100254 | A1* | 4/2009 | Moyer | G06F 9/30181 |
| | | | | 712/227 |
| 2013/0111448 | A1* | 5/2013 | Bates | G06F 11/362 |
| | | | | 717/125 |
| 2014/0068344 | A1* | 3/2014 | Miller | G06F 11/3636 |
| | | | | 714/45 |
| 2014/0068345 | A1* | 3/2014 | Miller | G06F 11/3636 |
| | | | | 714/45 |
| 2018/0181480 | A1* | 6/2018 | Dracea | G06F 11/3612 |
| 2018/0224504 | A1* | 8/2018 | Kim | G01R 31/3177 |

* cited by examiner

DEVICE AND METHOD FOR EVALUATING INTERNAL AND EXTERNAL SYSTEM PROCESSORS BY INTERNAL AND EXTERNAL DEBUGGER DEVICES

CROSS-REFERENCE TO RELATED PATENT APPLICATIONS

This application claims priority to U.S. Provisional Patent Application Ser. No. 62/912,490, entitled "Scalable architecture for microcontroller evaluation kits for mass-market ecosystem enablement," filed Oct. 8, 2019, the contents of such application being hereby incorporated by reference in its entirety and for all purposes as if completely and fully set forth herein.

TECHNICAL FIELD

The present implementations relate generally to system processors, and more particularly to evaluating internal and external system processors by internal and external debugger devices.

BACKGROUND

Conventional microcontroller evaluation kits lack sufficient capacity to evaluate system processors with internal and external debugger devices. Conventional microcontroller evaluation kits further lack sufficient capacity to evaluate internal and external system processors with debugger devices. Thus, there exists a need for evaluating internal and external system processors by internal and external debugger devices.

SUMMARY

Present implementations include an electronic device with a system processor (SP) region connectable to an SP, a primary device region connectable to a first electronic device, and a secondary device region disposed between the SP device region and the primary device region, and connectable to a second electronic device. Present implementations further include a debugger region including a debugger unit and disposed adjacent to the primary device region and the secondary device region. Present implementations also include obtaining a debug selection including a debugger selection and a system processor (SP) selection, entering a first debug mode in accordance with a determination that the debugger selection satisfies a debugger criterion and the SP selection satisfies an SP criterion, and entering a second debug mode in accordance with a determination that the debugger selection satisfies the debugger criterion and the SP selection does not satisfy the SP criterion, and entering a third debug mode in accordance with a determination that the debugger selection does not satisfy the debugger criterion.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

Figure 1:
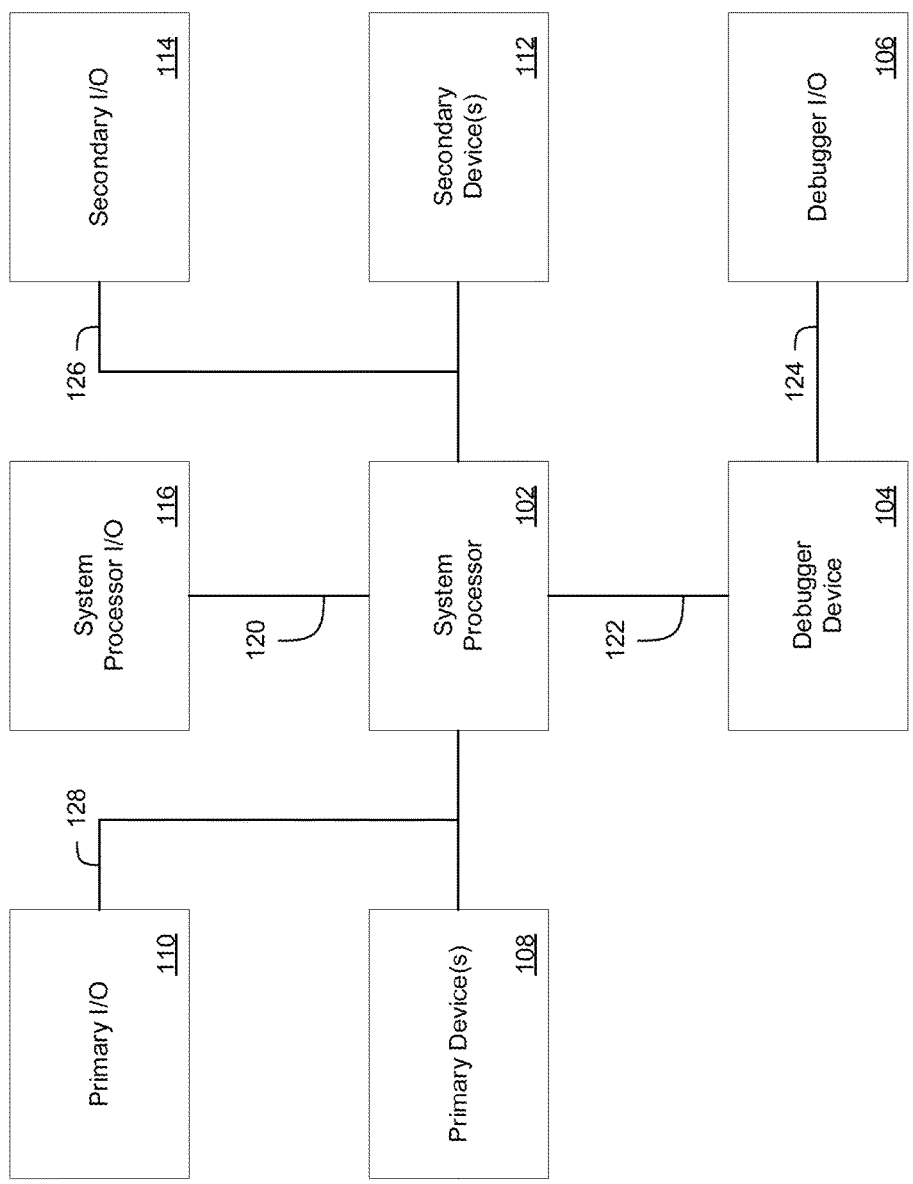
FIG. 1 illustrates an exemplary system in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Present implementations can demonstrate one or more technical advantages including a standardized and flexible device and system layout. Systems and devices in accordance with present implementations can thus be scaled and deployed to market more quickly, resulting advantageously in lower overall development costs. Systems and devices in accordance with present implementations can further support a large number of permutations of secondary devices and capabilities associated therewith, by allowing easier connection with numerous expansion modules through flexible secondary device compatibility. Systems and devices in accordance with present implementations can further provide multiple debugging options. Multiple debugging modes in accordance with present implementations can advantageously lower cost of ownership for users through a wide variety of debugging use cases including, but not limited to, two wire debugging and complex, near real-time, trace capture.

In accordance with present implementations, systems, devices and methods are directed to evaluation kits for system processor systems and devices. In accordance with present implementations, evaluation kits can include system processors and associated devices required for various applications, in a low cost and experimental package. In some implementations, evaluation kits support a common layout in which common devices and functions, and less common device and functions are arranged in standardized configurations to enable rapid prototyping and design revision for microcontroller systems. Further, in accordance with present implementations, evaluation kits can include support for debugging with an onboard debugging device capable of providing common debugging functions. Further, in accordance with present implementations, evaluation kits can include support for debugging with an external debugging device capable of providing expanded, uncommon, specialized, or like debugging functions.

FIG. 1 illustrates an exemplary system in accordance with present implementations. As illustrated in FIG. 1, an exemplary system 100 includes a system processor (SP) 102, a debugger device 104, a debugger input-output (I/O) interface 106, one or more primary devices 108, a primary I/O interface 110, one or more secondary devices 112, a secondary I/O interface 114, and an SP I/O interface 116.

The SP 102 is operable to execute one or more instructions and to interface with one or more external devices and I/O interfaces. In some implementations, the SP is an electronic processor, an integrated circuit, or the like including one or more of digital logic, analog logic, digital sensors, analog sensors, communication buses, volatile memory, nonvolatile memory, and the like. In some implementations, the SP includes but is not limited to, at least one microcontroller unit (MCU), microprocessor unit (MPU), central processing unit (CPU), graphics processing unit (GPU), physics processing unit (PPU), embedded controller (EC), or the like. In some implementations, the SP 102 includes a memory operable to store or storing one or more instructions for operating components of the SP 102 and operating components operably coupled to the SP 102. In some implementations, the one or more instructions include at least one of firmware, software, hardware, operating systems, embedded operating systems, and the like. In some implementations, the SP 102 is operably coupled to one or more of the debugger device 104, the debugger input-output (I/O) interface 106, the primary devices 108, the primary I/O interface 110, the secondary devices 112, the secondary I/O interface 114, and the microcontroller interface 116, by one or more of the communication channels 120, 122, 124, 126 and 128. It is to be understood that the communication channels 120, 122, 124, 126 and 128 can be implemented as distinct wires, leads, traces, or the like. It is to be further understood that the communication channels 120, 122, 124, 126 and 128 can be implemented as one or more wired or wireless digital or analog communication buses, or the like. It is to be understood that the SP 102 or the system 100 generally can include at least one communication bus controller to effect communication between the SP 102 and the other elements of system 100 via the communication channels 120, 122, 124, 126 and 128.

The debugger device 104 is operable to execute one or more instructions associated with operation of the SP 102. In some implementations, the debugger device 104 is an electronic processor, integrated circuit, or the like including a memory operable to store or storing one or more instructions for operating components of the debugger device 104 and operating components of the SP 102. In some implementations, the one or more instructions include at least one of firmware, software, hardware, operating systems, embedded operating systems, and the like. In some implementations, the debugger device is a processor including instructions for operating any SP compatible with the SP 102. In some implementations, the debugger device 104 includes instructions for monitoring operation of the SP 102. As one example, the debugger device 104 can "trace" changes in state of a memory or other component of the SP 102 to receive changes in the operating state of the SP 102 in response to execution of various instructions by the SP 102 or receipt of various instructions at the SP 102. In some implementations, the debugger device 104 includes instructions for modifying operation of the SP 102 by modifying, erasing, or adding instructions stored on the SP. As one example, the debugger device 104 can "flash" a memory of the SP 102 to transmit operating system instructions or program instructions to the SP 102.

The system 100 includes one or more I/O interfaces to effect communication within devices of the system 100 and between devices of the system 100 and external devices and systems. In some implementations, the I/O interfaces include one or more of pin connections, via connections, clip connections, compound pin "breadboard" or "header" connections and the like. Connections can operatively various digital, analog, electrical, electromechanical, electrostatic, wireless antenna, or like devices to one or more devices of the system 100. The debugger I/O interface 106 can operatively couple the debugger device 104 to an external device including but not limited to a debugger terminal. The primary I/O interface 110 can operatively couple at least one of the primary devices to an external device. The secondary I/O interface 114 can operatively couple at least one of the secondary devices to an external device. The SP I/O interface 116 can operatively couple one or more components of the SP 102 directly to an external device.

The one or more primary devices 108 can be included in the system 100 from among devices compatible with the SP 102 and associated with primary functions of the SP 102 or a device or system incorporating the SP 102. In some implementations, the primary devices 108 are devices associated with basic functions of the SP 102, the system 100, embedded system operation, or the like. The primary devices 108 can include, but are not limited to, port controllers for serial, parallel, USB, DVI, or like device ports. The primary devices 108 can further include, but are not limited to, expansion slots, supply power contacts, mounting vias, and the like. I The one or more secondary devices 112 can be included in the system 100 from among devices compatible with the SP 102 and associated with secondary functions of the SP 102 or a device or system incorporating the SP 102. In some implementations, the secondary devices 108 are devices associated with advanced functions of the SP 102, the system 100, embedded system operation, or the like. The secondary devices 112 can include, but are not limited to, networking interfaces, communication bus interfaces, sensor devices, memory devices, and the like. The secondary devices 112 can further include, but are not limited to, Ethernet interfaces, high speed USB interfaces, flash memory devices, and the like.

Figure 2:
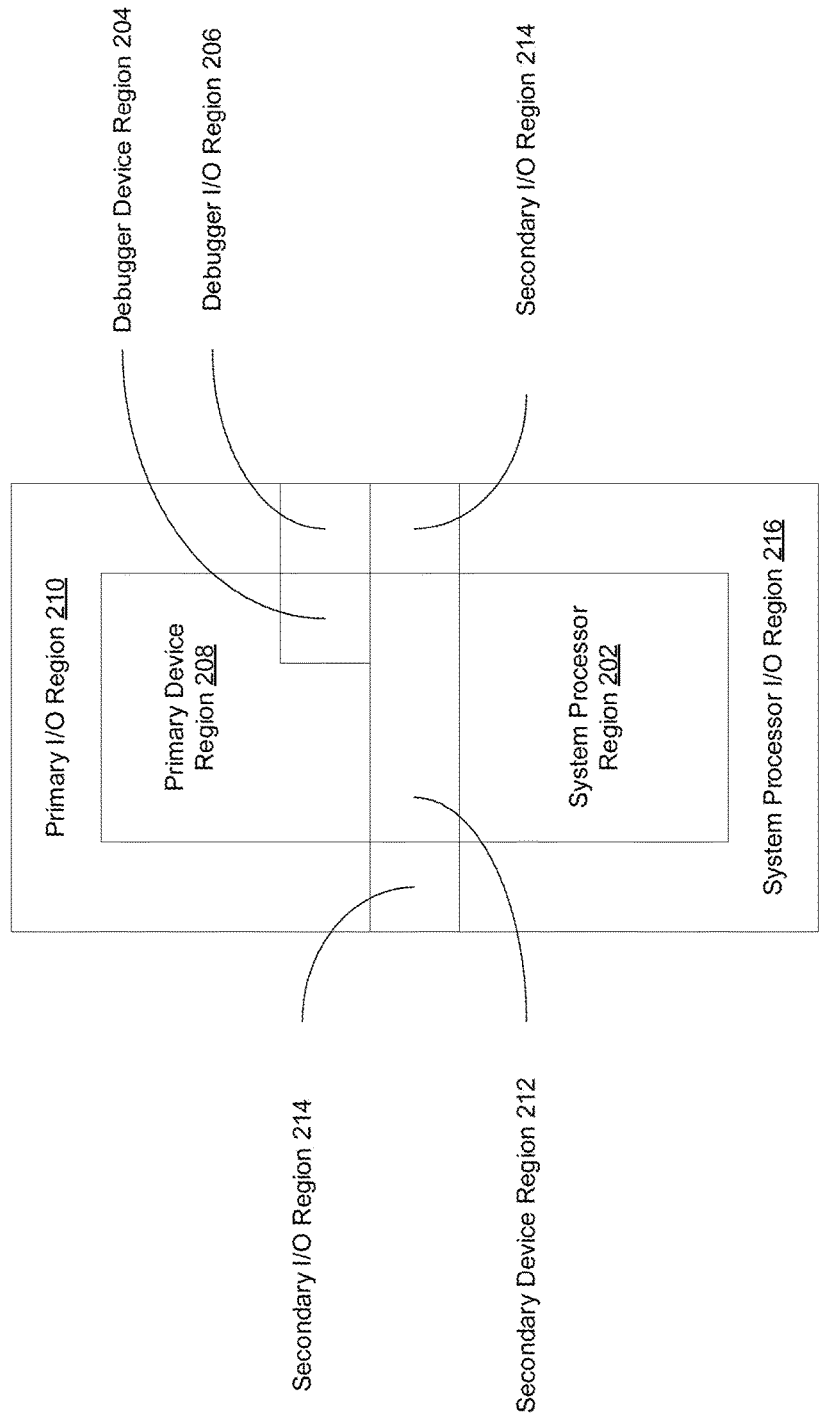
FIG. 2 illustrates an exemplary device in accordance with present implementations.

FIG. 2 illustrates an exemplary device in accordance with present implementations. As illustrated in FIG. 2, an exemplary device includes a system processor (SP) region 202, a debugger device region 204, a debugger I/O region 206, a primary device region 208, a primary I/O region 210, a secondary device region 212, a secondary I/O region 214, and an SP I/O region 216. In some implementations, the device 200 includes an electronic circuit board, printed circuit board, conductive substrate, or the like. In some implementations, the electronic circuit board includes a first planar surface engaging with one or more electronic devices, and a second opposite planar surface securing one or more contacts between the electronic circuit board and one or more devices operably coupled thereto. In some implementations, an electronic circuit board of the device includes the regions 202, 204, 206, 208, 210, 212, 214 and 216 disposed thereon. The device 200 can support devices of various types disposed in various locations to maximize variation of device functionality and consistency of operation with external devices.

The SP region 202 is operable to receive the SP 102, and operably couple the SP 102 to one or more of the regions 204, 206, 208, 210, 212, 214 and 216 and any device operably coupled thereto. In some implementations, the SP region 202 includes a system processor pin interface compatible with a plurality of system processors (SPs) including the SP 102. In some implementations, each of the plurality of compatible SPs include varying functionality with respect to each other. In some implementations, each of the plurality of compatible SPs include a common pinout structure operable to couple with the SP region 202. In some implementations, the device 200 alternately includes one of the plurality of compatible SPs possessing with varying functionality, thus varying the functionality of the device 200 through flexible swapping of SPs. In some implementations, the SP region 202 is disposed in a planar region away from one or more edges of a printed circuit board of the device 200.

The primary device region 208 is operable to receive one or more of the primary devices 108, and operably couple one or more of the primary devices 208 to one or more of the regions 202, 204, 206, 210, 212, 214 and 216 and any device operably coupled thereto. In some implementations, the primary device region 208 includes one or more of a power source, a power converter, a power test loop, a power LED, a power bus, a system control device, and a communication controller device. In some implementations, the primary device region is operable to superimpose currents by receiving electrical power concurrently from a plurality of power sources. In some implementations, the one or more of the plurality of power sources are external to the device 200. In some implementations, a power source or power converter compatible or integrated with the device 200 includes a low-dropout voltage regulator. In some implementations, a power test loop includes a current clamping loop, a voltage test loop, or the like for a power supply to the electronic device 200, the SP 102, the SP region 202, any device or region of the device 200 or operably coupled thereto, or the like. A system control device includes a button, jumper, or the like operable to effect one or more functions of the electronic device 200 or any device or region thereof or operably coupled thereto. As one example, a system control device can be a system reset button, power on/off switch, boot configuration jumper, or the like. A communication controller device includes an electronic device for receiving and transmitting a communication signal in accordance with one or more electrical or electronic communication protocols, conventions, patterns, or the like. As one example, a communication control device can be one or more of a serial communication integrated circuit and a USB communication integrated circuit. In some implementations, the primary device region 208 is compatible only with USB full-speed communication. In some implementations, the primary device region 208 is disposed in a planar region away from one or more edges of a printed circuit board of the device 200 and away from the SP region 202.

The secondary device region 212 is operable to receive one or more of the secondary devices 112, and operably couple one or more of the secondary devices 112 to one or more of the regions 202, 204, 206, 208, 210, 214 and 216 and any device operably coupled thereto. In some implementations, the secondary device region 212 includes one or more secondary devices 112, including but not limited to, one or more of a communication interface and an electronic device distinct from any electronic device associated with the primary device region 208. As one example, the secondary device region 212 can include an Ethernet port, an Ethernet communication integrated circuit, a high speed USB communication integrated circuit, and the like. As another example, the secondary device region 212 can include a flash memory device, a flash memory communication integrated circuit, a magnetic memory controller, a multi-channel communication bus controller, and the like. In some implementations, the secondary device region 212 alternatingly includes one or more of the secondary devices 112 compatible with the secondary device region 212 and the SP 102, thus varying the functionality of the device 200 through flexible swapping of various secondary devices compatible with the SP 102. In some implementations, the secondary device region 208 is disposed in a planar region away from one or more edges of a printed circuit board of the device 200, adjacent to the primary device region 208, and adjacent to the SP region 202.

The debugger device region 204 is operable to receive the debugger device 104, and operably couple the debugger device 104 to one or more of the regions 202, 206, 208, 210, 212, 214 and 216 and any device operably coupled thereto. In some implementations, the debugger device region 204 includes the debugger device 104, and one or more communication channels between the debugger device 104 and the SP 102. In some implementations, the debugger device 104 is operable to perform at least one debugging function with respect the SP 102. A debugging function includes, but is not limited to, monitoring execution of one or more instructions executed on the SP 102, controlling execution of one or more instructions executed by the SP 102, and modifying one or more instructions stored by the SP 102 or any device operably coupled thereto. In some implementations, the debugger device is operable to receive one or more debugging instructions from an external debugging terminal, transmit one or more debugging results to the debugging terminal, or perform a combination thereof in response to one or more debugging instructions received from the debugging terminal or any device operably coupled thereto. In some implementations, the monitoring and controlling execution includes monitoring and controlling execution of instructions executed by the SP 102 and associated with devices external to the SP 102. Devices external to the SP 102 include but are not limited to any devices integrated with or operably coupled to one or more of the regions 202, 206, 208, 210, 212, 214 and 216 and any device operably coupled thereto. Thus, in some implementations, the debugger device region 204 effectuates a link between the debugger device 104 and all devices and regions of the electronic device 200 coupled to the SP 102, through a debug-level interface with the SP 102. In some implementations, the debugger device region 204 is disposed in a planar region away from one or more edges of a printed circuit board of the device 200, adjacent to the primary device region 208, adjacent to the secondary device region 212, and away from the SP region 202.

The primary I/O region 210 is operable to couple one or more of the primary devices 110 and the primary device region 208 to one or more external devices. In some implementations, the primary I/O region 210 includes one or more connection interfaces to operatively couple the electronic device 200 to one or more external microprocessors, external communication buses, and the like. In some implementations, the primary I/O region 210 includes one or more user I/O devices to receive information from and transmit information to a user of the device. In some implementations, user I/O devices include user input buttons, user status LEDs, and disconnect traces for one or more regions and any devices operably coupled thereto. In some implementations, the primary I/O region 210 is disposed in a planar region adjacent to one or more edges of a printed circuit board of the device 200, and adjacent to and at least partially surrounding the primary device region 208. In some implementations, the primary I/O region 210 includes one or more connectors, interfaces, or the like operable to couple one or more external devices to the electronic device 200. In some implementations, the primary I/O region is operable to receive concurrent communication from a plurality of concurrently connected devices. In some implementations, concurrently connected devices are serially connected to each other and to the electronic device by "daisy-chaining" or the like. In some implementations, concurrent communication includes communication by or including one or more protocols, frameworks, or the like compatible with one or more embedded systems.

The SP I/O region 216 is operable to couple one or more of the SP 102 and SP region 202 to one or more external devices. In some implementations, the SP I/O region 216 includes one or more connection interfaces to operatively couple the SP 102 to one or more external devices. In some implementations, the SP I/O region 216 includes one or more compound pin "breadboard" or "header" connections. In some implementations, the SP I/O region 216 includes a graphics expansion port to operatively couple the SP 102 to an external video output device or video display device. In some implementations, the SP I/O region 216 is disposed in a planar region adjacent to one or more edges of a printed circuit board of the device 200, and adjacent to and at least partially surrounding the SP region 202.

The secondary I/O region 212 is operable to couple one or more of the secondary devices 112 and the secondary device region 210 to one or more external devices. In some implementations, the secondary I/O region 212 includes one or more connection interfaces to operatively couple the electronic device 200 to one or more external microprocessors, external communication buses, and the like. In some implementations, the secondary I/O region 212 is disposed in a planar region adjacent to one or more edges of a printed circuit board of the device 200, adjacent to the primary I/O region 210, adjacent to the secondary device region 212, and adjacent to the SP I/O region 216.

The debugger I/O region 206 is operable to couple the debugger device 104 and the debugger device region 204 to one or more external devices. In some implementations, the secondary I/O region 212 includes one or more connection interfaces to operatively couple the electronic device 200 to one or more external microprocessors, external communication buses, and the like. In some implementations, the debugger I/O region 206 includes one or more connection interfaces or one or more LED devices. Exemplary connection interfaces include, but are not limited to, micro USB connectors or the like coupled to the debugger device 104. Exemplary connection interfaces further include, but are not limited to, one or more jumpers operable to select one or more debug modes. In some implementations, jumpers couple with jumper pins in various combinations to select between a plurality of debug modes including a first "onboard debug" mode, a second "external debugger" mode, and a third "external SP debug" mode of the electronic device. In various debug modes, the debugger I/O region operably couples or decouples the debugger device to or from various regions of the electronic device 200 or external devices operably coupled thereto. Exemplary LED devices include, but are not limited to, status LEDs for communicating a state of the debugger device 104, debugger operation performed by the debugger device 104, or the like.

Figure 3:
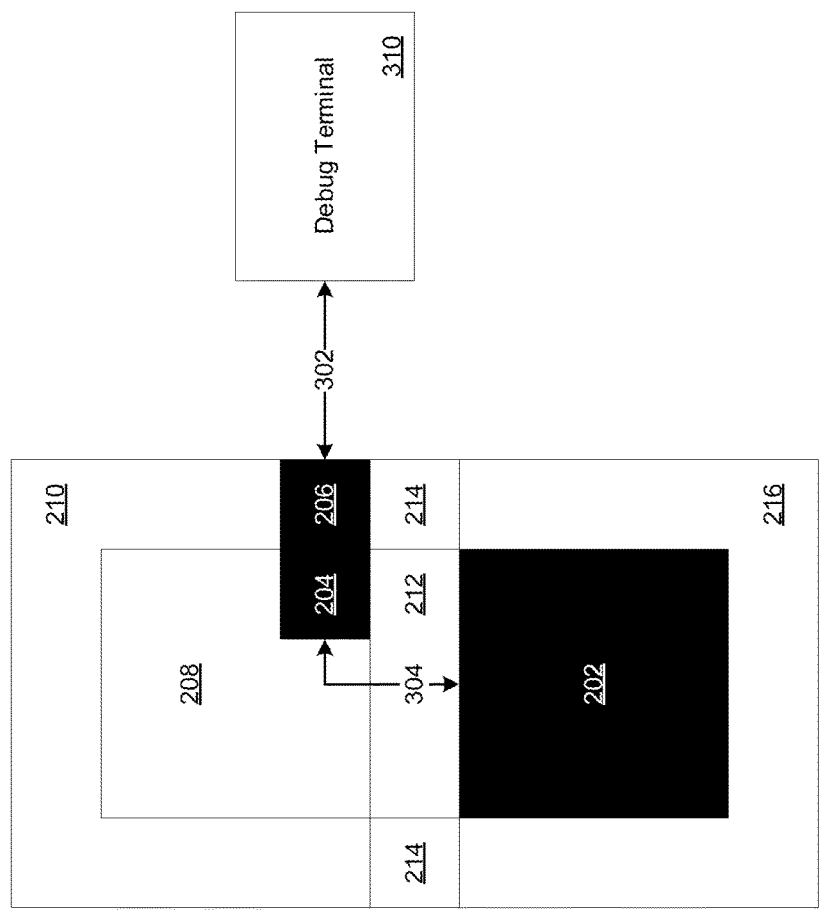
FIG. 3 illustrates the exemplary device of FIG. 2 operating in an exemplary first mode.

FIG. 3 illustrates the exemplary device of FIG. 2 operating in an exemplary first mode. As illustrated in FIG. 3, an exemplary device 300 includes the exemplary device of FIG. 2, further operably coupled to a debug terminal 310. The exemplary device 300 is operatively coupled by a debug terminal onboard I/O path 302 and a debugger-onboard I/O path 304. The exemplary device 300 operates in a first "onboard debug" mode. In some implementations, the exemplary device 300 selectably enters the "onboard debug" mode in response to a first jumper setting on the debugger I/O region 206 corresponding to the "onboard debug" mode.

The debug terminal 310 is operably coupled to the exemplary device 300 to provide a user interface to a user for debugging the SP 102. In some implementations, the debug terminal 310 is a computing device, laptop computer, notebook computer, mobile device, handheld device, or the like. In some implementations, the debug terminal includes one or more instructions for operatively coupling with the debugger device 104. As one example, the debug terminal 310 includes a graphical user interface and an integrated development environment compatible with the SP 102. As another example, the debug terminal 310 includes one or more of a command-line interface, a command logger, an input-out logger, and the like. The debug terminal onboard I/O path 302 operatively couples the debug terminal 310 to the debugger I/O region 206. In the exemplary device 300, the debugger I/O region 206 is operably coupled to the debugger region 204, and the debugger region 204 is operably coupled to the debugger device 104 disposed therewith, thereon, or the like. The debugger-onboard I/O path 304 operatively couples the debugger region 204 to the SP region 202. In the exemplary device 300, the SP region 202 is operatively coupled to the SP 102. Thus, the electronic device 300 is operable to perform debugging of the SP 102 by the debugger device 104 and the debug terminal 310.

Figure 4:
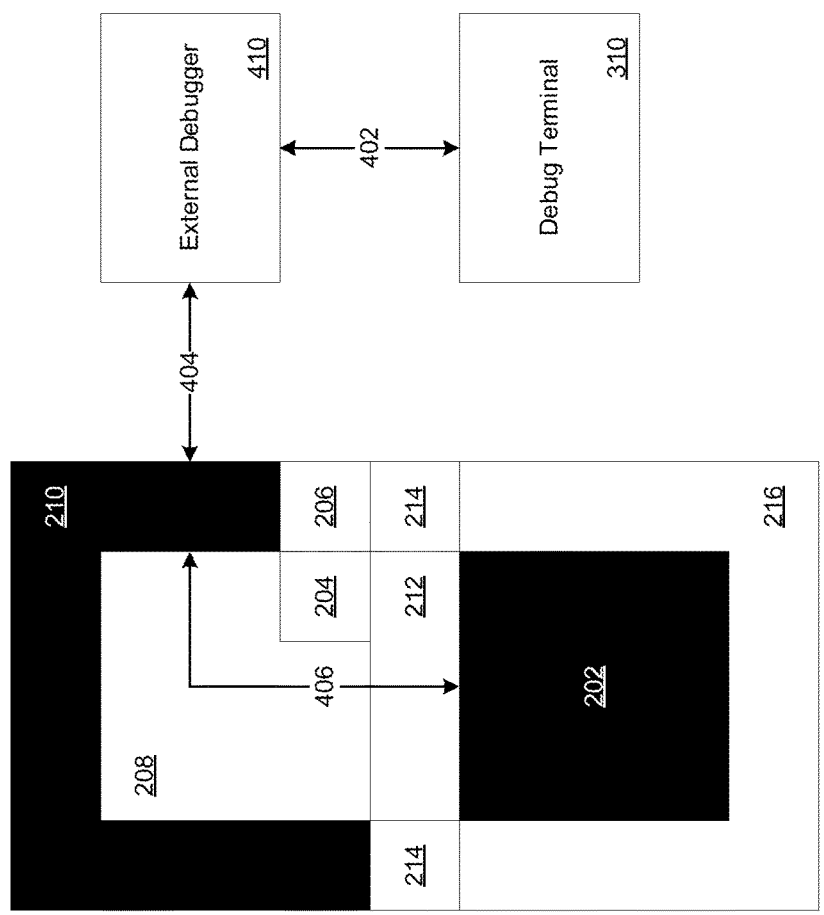
FIG. 4 illustrates the exemplary device of FIG. 2 operating in an exemplary second mode.

FIG. 4 illustrates the exemplary device of FIG. 2 operating in an exemplary second mode. As illustrated in FIG. 4, an exemplary device 400 includes the exemplary device of FIG. 2, further operably coupled to the debug terminal 310 and an external debugger 410. The exemplary device 400 is operatively coupled by a debug terminal external I/O path 402, an external debugger I/O path 404, and a debugger-bypass I/O path 406. The exemplary device 400 operates in a second "external debugger" mode. In some implementations, the exemplary device 400 selectably enters the "external debugger" mode in response to a second jumper setting on the debugger I/O region 206 corresponding to the "external debugger" mode.

The external debugger 410 is operable to execute one or more instructions associated with operation of the SP 102. In some implementations, the external debugger 104 is an electronic processor, integrated circuit, or the like in accordance with the debugger device 104. In some implementations, the external debugger is operable to perform one or more debugging operations distinct from debugging operations of the debugger device. In some implementations, an exemplary external debugger 410 is operable to monitor 104 instructions of the SP 102 to or from one or more secondary devices 112 that the debugger device 104 cannot monitor. It is to be understood that the external debugger 410 is operable to perform monitoring, modification, or like instructions with respect to the SP 102 and devices operably coupled thereto, and that all aspects of functionality differing between the external debugger 410 and the debugger device 104 are not limited to those described herein. The debug terminal external I/O path 402 operatively couples the debug terminal 310 to the external debugger 410. The external debugger I/O path 404 operatively couples the external debugger 410 to the primary I/O region 210. The debugger-bypass I/O path 406 operatively couples the primary I/O region 210 to the SP region 202. In the exemplary device 400, the SP region 202 is operatively coupled to the SP 102. Thus, the electronic device 400 is operable to perform debugging of the SP 102 by the external debugger 104 and the debug terminal 310.

Figure 5:
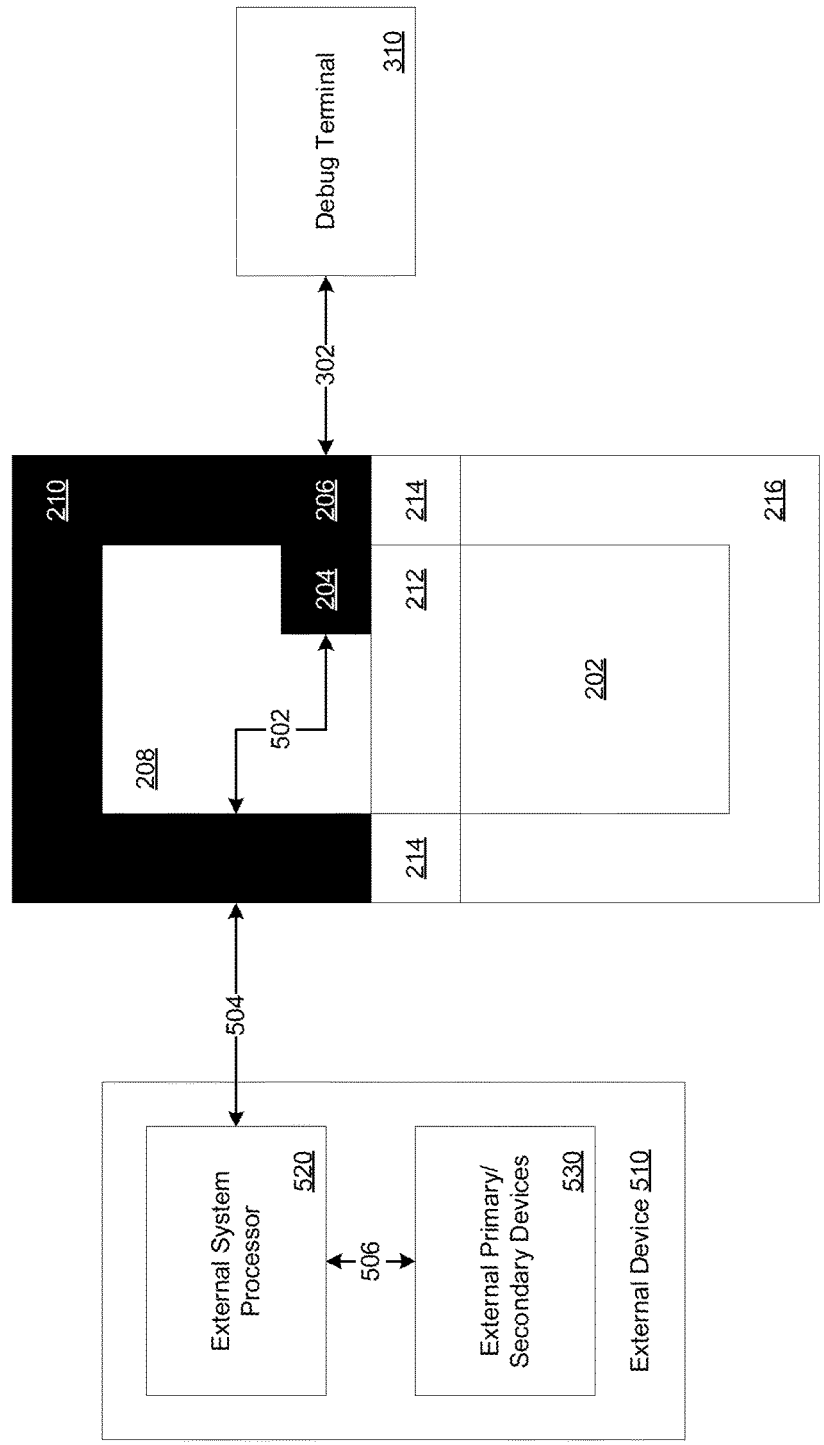
FIG. 5 illustrates the exemplary device of FIG. 2 operating in an exemplary third mode.

FIG. 5 illustrates the exemplary device of FIG. 2 operating in an exemplary third mode. As illustrated in FIG. 5, an exemplary device 500 includes the exemplary device of FIG. 2, further operably coupled to the debug terminal 310, and an external device 510 including an external SP 520 and one or more primary devices or secondary devices 530. The exemplary device 500 is operatively coupled by the debug terminal onboard I/O path 302, an SP-bypass I/O path 502, and an external SP I/O path 504. The external device 510 is operatively coupled by an external primary-secondary device I/O path 506. The exemplary device 500 operates in a third "external SP debug" mode. In some implementations, the exemplary device 500 selectably enters the "external SP debug" mode in response to a third jumper setting on the debugger I/O region 206 corresponding to the "external SP debug" mode.

The external device 510 includes one or more devices and I/O interfaces corresponding to the system 100. In some implementations, the external device 510 includes a printed circuit board, breadboard, or the like having a subset of devices and I/O interfaces of the system 100 disposed thereon, therewith, or the like. In some implementations, the printed circuit board of the external device 510 is customized for a particular application including the external SP 520. The external SP 520 is operable correspondingly, identically, or the like to the SP 102. In some implementations, the external SP 520 is an electronic processor, integrated circuit, or the like in accordance with the SP 102.

The external primary-secondary devices 530 can be included in the external device 510 from among devices compatible one or more of the primary devices 108 and the secondary devices 112. The external device 510 can include one or more or the primary devices 108, one or more of the secondary devices 112, a combination thereof, or none thereof, according to the particular application of the external device 510. As one example, the external device can include an Ethernet secondary device for a networking application, and not include the Ethernet secondary device in another application aside from Ethernet networking. The debug terminal 310 operatively couples to the debugger device 104 and the debugger device region 204 correspondingly to the operative coupling of the debug terminal 310 to the debugger device 104 and the debugger device region 204 in the electronic device 300. The SP-bypass I/O path 502 operatively couples the debugger device region 204 to the primary I/O region 210. The external SP I/O path 504 operatively couples the primary I/O region 210 to the external SP 420. In some implementations, the external SP I/O path 504 operatively couples the primary I/O region 210 directly to the external SP 520. Alternatively, in some implementations, the external SP I/O path 504 operatively couples the primary I/O region 210 indirectly to the external SP 520 through an external SP I/O interface or the like. Thus, the electronic device 500 is operable to perform debugging of the external SP 520 by the debugger device 104 and the debug terminal 310. In some implementations, the external primary-secondary device I/O path 506 operatively couples the external SP 520 to the external primary-secondary devices 530, where the external SP 520 includes instructions therefor.

Figure 6:
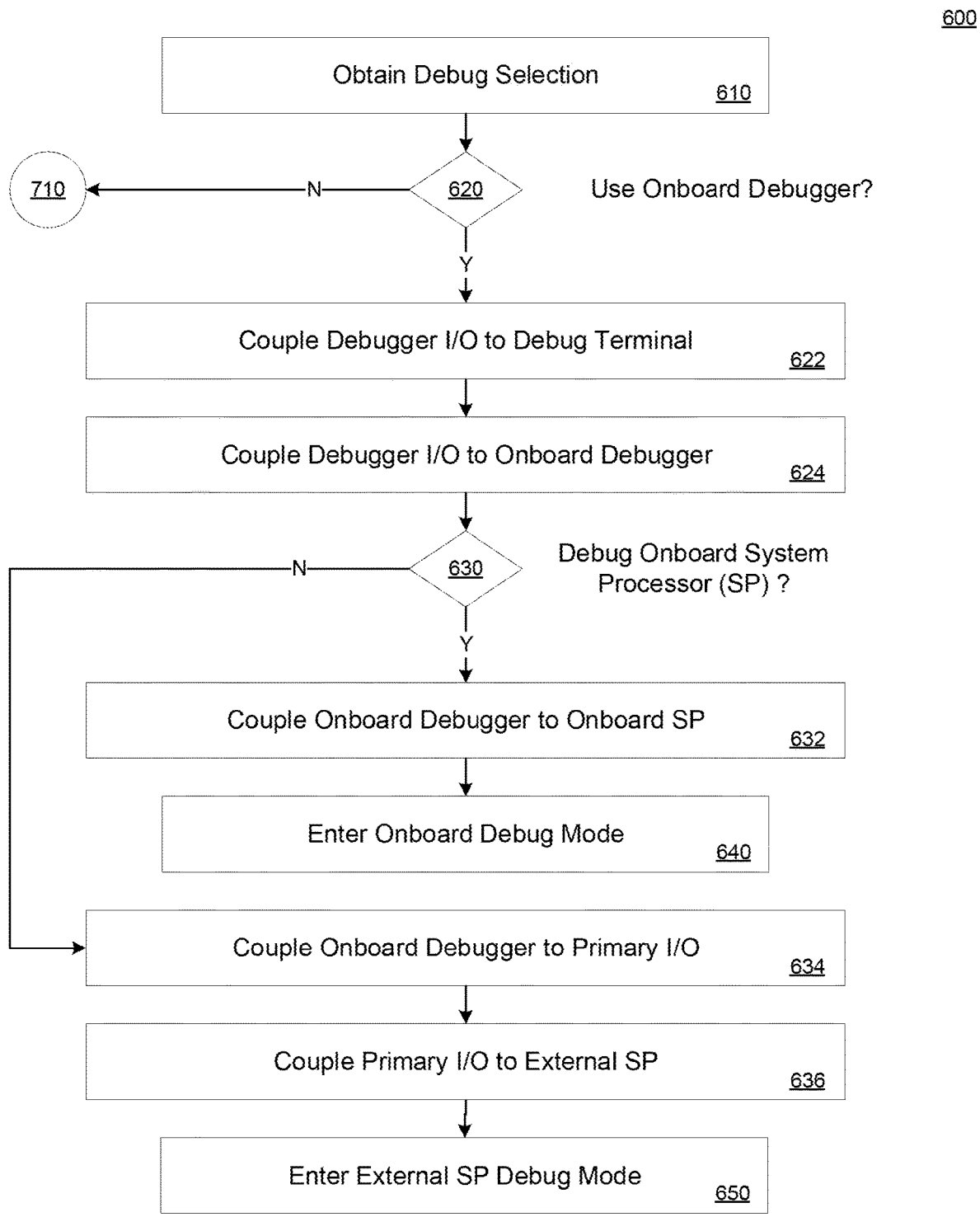
FIG. 6 illustrates an exemplary method in accordance with present implementations.

FIG. 6 illustrates an exemplary method in accordance with present implementations. In some implementations, an exemplary system in accordance with at least one of the system 100 and the devices 200-500 performs the method 600. At step 610, an exemplary system obtains a debug selection. In some implementations, the exemplary system obtains the debug selection in accordance with a selectable jumper setting specified in the debugger I/O region 206. The method 600 then continues to step 620.

At step 620, the exemplary system determines whether the obtained debug selection satisfies an "onboard debug" condition. In some implementations, at least one of the debugger device 104 and the debugger I/O region 206 determines whether the obtained debug selection satisfies the "onboard debug" condition by a logical switch, selector, or the like in response to the selectable jumper setting. In accordance with a determination that the obtained debug selection satisfies an "onboard debug" condition, the method 600 continues to step 622. Alternatively, in accordance with a determination that the obtained debug selection does not satisfy the "onboard debug" condition, the method 600 continues to step 710. At step 622, the exemplary system couples the debugger I/O region 206 to the debug terminal 310. In some implementations, the exemplary system couples the debugger I/O region 206 to the debug terminal 310 in accordance with the debug terminal onboard I/O path 302. The method 600 then continues to step 624. At step 624, the exemplary system couples the debugger I/O region 206 to the debugger region 204. The method 600 then continues to step 630.

At step 630, the exemplary system determines whether the obtained debug selection satisfies an "external SP debug" condition. In some implementations, at least one of the debugger device 104 and the debugger I/O region 206 determines whether the obtained debug selection satisfies the "external SP debug" condition by a logical switch, selector, or the like in response to the selectable jumper setting. In accordance with a determination that the obtained debug selection does not satisfy the "external SP debug" condition, the method 600 continues to step 632. Alternatively, in accordance with a determination that the obtained debug selection satisfies the "external SP debug" condition, the method 600 continues to step 634. At step 632, the exemplary system couples the debugger region 204 to the SP region 202. In some implementations, the exemplary system couples the debugger I/O region 206 to the debugger region 204 in accordance with the debugger-onboard I/O path 304. The method 600 then continues to step 640. At step 640, the exemplary system enters an "onboard debug" mode. In some implementations, the method 600 ends at step 640.

At step 634, the exemplary system couples the debugger region 204 to the primary I/O region 210. In some implementations, the exemplary system couples the debugger region 204 to the primary I/O region 210 in accordance with the SP-bypass I/O path 502. The method 600 then continues to step 636. At step 636, the exemplary system couples the primary I/O region 210 to the external SP 520. In some implementations, the exemplary system couples the primary I/O region 210 to the external SP 520 in accordance with the external SP I/O path 504. The method then continues to step 650. At step 650, the exemplary system enters an "external SP debug" mode. In some implementations, the method 600 ends at step 650.

Figure 7:
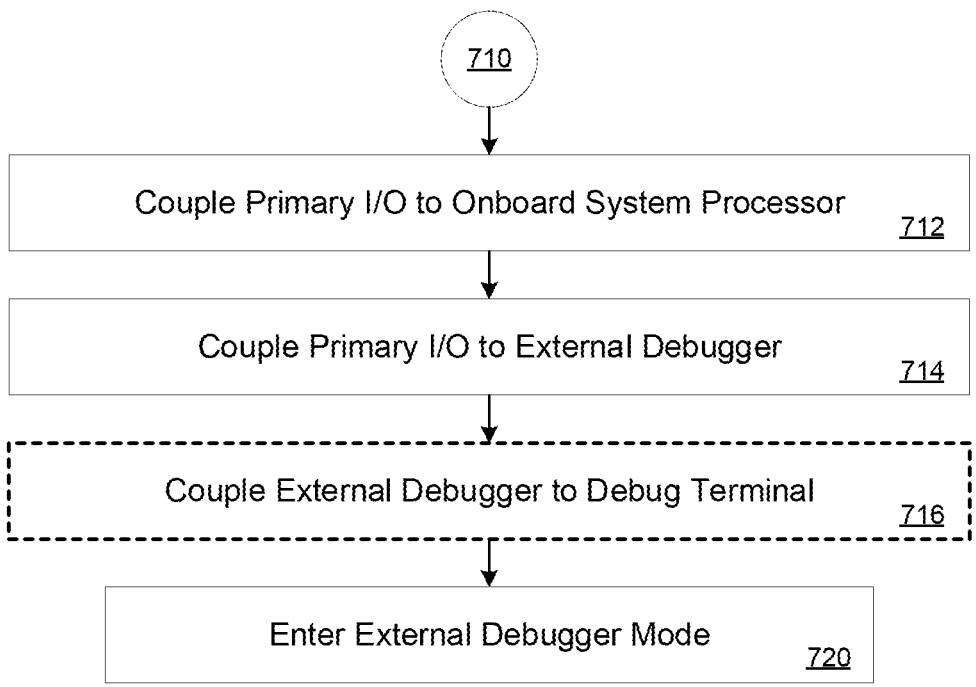
FIG. 7 illustrates an exemplary method further to the exemplary method of FIG. 6.

FIG. 7 illustrates an exemplary method further to the exemplary method of FIG. 6. In some implementations, an exemplary system in accordance with at least one of the system 100 and the devices 200-500 performs the method 700. At step 710, the method 700 continues from the method 600. The method 700 then continues to step 712.

At step 712, the exemplary system couples the primary I/O region 210 to the SP region 202. In some implementations, the exemplary system couples the primary I/O region 210 to the SP region 202 in accordance with the debugger-bypass I/O path 406. The method 700 then continues to step 714. At step 714, the exemplary system couples the primary I/O region 210 to the external debugger 410. In some implementations, the exemplary system couples the primary I/O region 210 to the external debugger 410 in accordance with the external debugger I/O path 404. The method 700 then continues to step 716. At step 716, the exemplary system obtains a coupling from the external debugger 410 to the debug terminal 310. In some implementations, the exemplary system obtains a coupling from the external debugger 410 to the debug terminal 310 in accordance with the debug terminal external I/O path 402. In some implementations, the exemplary system obtains the coupling by passive receipt of the state of the coupling, or obtains the coupling by successfully executing an instruction to the debug terminal 310 and receiving a subsequent response from the debug terminal 310. The method 700 then continues to step 720. At step 720, the exemplary system enters an "external debugger" mode. In some implementations, the method 700 ends at step 720.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. An electronic device comprising:
    an electronic circuit board including:
        a system processor (SP) region connectable to an SP, wherein the SP is configurable in a plurality of debug modes in accordance with a debugger criterion and an SP criterion;
        a primary device region connectable to a first electronic device; and
        a secondary device region disposed between the SP region and the primary device region, and connectable to a second electronic device, wherein the electronic device:
    enters a first debug mode in accordance with a determination that a debugger selection satisfies the debugger criterion and an SP selection satisfies the SP criterion;
    enters a second debug mode in accordance with a determination that the debugger selection satisfies the debugger criterion and the SP selection does not satisfy the SP criterion; and
    enters a third debug mode in accordance with a determination that the debugger selection does not satisfy the debugger criterion.

2. The electronic device of claim 1, wherein the electronic circuit board further includes:
    a debugger device region including a debugger unit and disposed adjacent to the primary device region and the secondary device region.

3. The electronic device of claim 2, wherein the electronic circuit board further includes:
    a debugger input-output (I/O) region disposed adjacent to the debugger device region.

4. The electronic device of claim 3, wherein the electronic circuit board further includes:
    a primary I/O region at least partially surrounding the primary device region and disposed adjacent to the debugger I/O region.

5. The electronic device of claim 4, wherein the electronic circuit board further includes:
    a secondary I/O region disposed adjacent to the debugger I/O region, the primary I/O region, and the secondary device region.

6. The electronic device of claim 1, wherein the first electronic device is connectable to only the primary device region.

7. The electronic device of claim 1, wherein the second electronic device is connectable to only the secondary device region.

8. The electronic device of claim 1, wherein the second electronic device is selectably connectable to the secondary device region from among a plurality of electronic devices connectable to the secondary device region.

9. The electronic device of claim 8, wherein the plurality of electronic devices are alternatively connectable to the secondary device region.

10. The electronic device of claim 8, wherein the plurality of electronic devices are concurrently connectable to the secondary device region.

11. The electronic device of claim 5, wherein the electronic circuit board further includes:
    an SP I/O region at least partially surrounding the SP region and disposed adjacent to the secondary I/O region.

12. A method comprising:
    obtaining, by an electronic device, a debug selection including a debugger selection and a system processor (SP) selection, wherein the electronic device includes an SP, a debugging processor, a debugger input-output (I/O) interface, and a primary I/O interface;
    entering, by the electronic device, a first debug mode in accordance with a determination that the debugger selection satisfies a debugger criterion and the SP selection satisfies an SP criterion;
    entering, by the electronic device, a second debug mode in accordance with a determination that the debugger selection satisfies the debugger criterion and the SP selection does not satisfy the SP criterion; and
    entering, by the electronic device, a third debug mode in accordance with a determination that the debugger selection does not satisfy the debugger criterion.

13. The method of claim 12, wherein the entering the first debug mode further comprises:
    coupling the debugger I/O interface to an external debugging terminal; and
    coupling the debugger I/O interface to the debugging processor.

14. The method of claim 13, wherein the entering the first debug mode further comprises:
    coupling the debugging processor to the SP.

15. The method of claim 14, wherein the debugging processor, the SP, and the debugger I/O interface are integrated into one electronic device.

16. The method of claim 12, wherein the entering the second debug mode further comprises:
    coupling the debugger I/O interface to an external debugging terminal; and
    coupling the debugger I/O interface to the debugging processor.

17. The method of claim 16, wherein the entering the second debug mode further comprises:
    coupling the debugging processor to the primary I/O interface; and
    coupling the primary I/O interface to an external SP.

18. The method of claim 12, wherein the entering the third debug mode further comprises:
    coupling the primary I/O interface to the SP; and
    coupling the primary I/O interface to an external debugging processor.

19. The method of claim 12, wherein the debugging processor and the primary I/O interface are integrated into one electronic device.

20. A method comprising:
    obtaining, by an electronic device, a debug selection including a debugger selection and a system processor (SP) selection, wherein the electronic device includes an SP, a debugging processor, a debugger input-output (I/O) interface, and a primary I/O interface;

entering, by the electronic device, a first debug mode in accordance with a determination that the debugger selection selects the debugging processor and the SP selection selects the SP;

entering, by the electronic device, a second debug mode in accordance with a determination that the debugger selection selects the debugging processor and the SP selection does not select the SP; and entering, by the electronic device, a third debug mode in accordance with a determination that the debugger selection does not select the debugging processor.

* * * * *